United States Patent
Herrmann et al.

US006332943B1

(10) Patent No.: US 6,332,943 B1
(45) Date of Patent: Dec. 25, 2001

(54) METHOD OF INK-JET PRINTING WITH PIGMENT PREPARATIONS HAVING A DISPERSANT

(75) Inventors: Manfred Herrmann, Ludwigshafen; Günther König, Maxdorf; Rüdiger Sens, Ludwigshafen; Bernd Siegel, Otterstadt; Karl Siemensmeyer, Frankenthal, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/446,894

(22) PCT Filed: Jun. 18, 1998

(86) PCT No.: PCT/EP98/03708

§ 371 Date: Mar. 31, 2000

§ 102(e) Date: Mar. 31, 2000

(87) PCT Pub. No.: WO99/01516

PCT Pub. Date: Jan. 14, 1999

(30) Foreign Application Priority Data

Jun. 30, 1997 (DE) .............................. 197 27 766
Dec. 5, 1997 (DE) .............................. 197 53 831

(51) Int. Cl.$^7$ ...................... B32B 31/12; C09D 11/100; B41J 2/01
(52) U.S. Cl. ................. 156/277; 427/496; 427/508; 427/521; 427/372.2; 427/256; 347/100; 106/31.86; 106/31.87; 106/31.9; 106/503
(58) Field of Search ............. 156/275.5, 275.7, 156/277; 427/508, 521, 496, 372.2, 407.1, 256; 106/499, 503, 31.86, 31.87, 31.9; 516/77, 909, 920; 8/583, 589; 347/100

(56) References Cited

U.S. PATENT DOCUMENTS

| | | |
|---|---|---|
| 2,979,528 | 4/1961 | Lundated . |
| 4,204,010 * | 5/1980 | Kramm et al. ................. 427/508 |
| 4,218,218 | 8/1980 | Daubach et al. . |
| 4,287,039 | 9/1981 | Buethe et al. . |
| 5,186,846 | 2/1993 | Brueckmann et al. . |
| 5,538,549 | 7/1996 | Kato et al. . |

FOREIGN PATENT DOCUMENTS

| | | |
|---|---|---|
| 2185245 | 10/1995 | (CA) . |
| 36 41 677 | 6/1988 | (DE) . |
| 44 13 242 | 10/1995 | (DE) . |
| 0 012 339 | 6/1980 | (EP) . |
| 0 279 303 | 8/1988 | (EP) . |
| 0 412 548 | 2/1991 | (EP) . |
| 0 518 621 | 12/1992 | (EP) . |
| 0 542 052 | 5/1993 | (EP) . |
| 0 658 607 | 6/1995 | (EP) . |
| 0 704 469 | 4/1996 | (EP) . |
| 0 753 552 | 1/1997 | (EP) . |
| 1 551 829 | 9/1979 | (GB) . |
| 8-48922 | 2/1996 | (JP) . |

* cited by examiner

*Primary Examiner*—Michael A. Tolin
(74) *Attorney, Agent, or Firm*—Oblon, Spivak, McClelland, Maier & Neustadt, P.C.

(57) ABSTRACT

Pigment preparation for the ink-jet process which comprises A) at least one finely divided, organic or inorganic pigment, B) a dispersant based on arylsulfonic acid/formaldehyde condensation products or an alkoxylated phenols, and C) water, as essential constituents. It provides for prints of high light fastness, wash fastness and rub fastness.

5 Claims, No Drawings

METHOD OF INK-JET PRINTING WITH PIGMENT PREPARATIONS HAVING A DISPERSANT

FIELD OF THE INVENTION

The present invention relates to the novel pigment preparations for the ink-jet process, comprising A) at least one finely divided, organic or inorganic pigment, B) a dispersant based on arylsulfonic acid/formaldehyde condensation products or on alkoxylated phenols, and C) water, as essential constituents.

BACKGROUND OF THE INVENTION

This invention further relates to a process for printing sheetlike or three-dimensionally configured substrates by the ink-jet process using these pigment preparations.

Inks for use in the ink-jet process have to meet a whole series of requirements: They have to have a viscosity and surface tension suitable for printing, they have to be stable in storage, ie. they should not coagulate and the dispersed, undissolved colorant should not settle out, they must not lead to blockage of the printer nozzle, which can likewise be problematical especially in the case of pigmented inks, ie. inks comprising dispersed colorant particles, and finally they should be environmentally compatible, ie. be substantially based on water as liquid phase and include organic solvents only in small amounts, if at all. In addition, the prints obtained have to meet coloristic requirements, ie. show brilliance and depth, and have good fastness properties, eg. rub fastness, lightfastness and water fastness or washfastness in the case of textile printing.

Existing ink-jet inks include not only pigment, dispersant and optionally further assistants but also, at the same time, a binder component, for example a UV-curable binder (EP-A-658 607, JP-A-48922/1996) or a thermally curable binder (EP-A-753 552, EP-A-412 548).

In these inks, the individual constituents have to be in perfect harmony to obtain storage-stable, noncoagulating inks having good flow behavior and good fastness properties, which can lead to difficulties.

BRIEF SUMMARY OF THE INVENTION

It is an object of the present invention to provide novel pigment preparations having advantageous application properties for the ink-jet process.

DETAILED DESCRIPTION OF THE INVENTION AND PREFERRED EMBODIMENTS THEREOF

We have found that this object is achieved by the pigment preparations defined at the beginning.

The pigment preparations of the invention comprise a finely divided, organic or inorganic pigment. The expression "organic pigment" includes vat dyes. The pigment preparations of the invention may also comprise mixtures of various organic or various inorganic pigments or of organic and inorganic pigments.

Examples of suitable pigments (A) are:
organic pigments:

| | |
|---|---|
| monoazo pigments: | C.I. Pigment Brown 25; C.I. Pigment Orange 5, 13, 36 and 67; C.I Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 251, 112, 146, 170, 184, 210 and 245; C.I. Pigment Yellow 1, 3, 73, 74, 65, 97, 151 and 183; |
| disazopigments: | C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188; |
| anthanthrone pigments: | C.I. Pigment Red 168 (C.I. Vat Orange 3); |
| anthraquinone pigments: | C.I. Pigment Yellow 147 and 177; C.I. Pigment Violet 31; |
| anthrapyrimidine pigments: | C.I. Pigment Yellow 108 (C.I. Vat Yellow 20); |
| quinacridone pigments: | C.I. Pigment Red 122, 202 and 206 C.I. Pigment Violet 19; |
| quinophthalone pigments: | C.I. Pigment Yellow 138; |
| dioxazine pigments: | C.I. Pigment Violet 23 and 37; |
| flavanthrone pigments: | C.I. Pigment Yellow 24 (C.I. Vat Yellow 1); |
| indanthrone pigments: | C.I. Pigment Blue 60 (C.I. Vat Blue 4) and 64 (C.I. Vat Blue 6); |
| isoindoline pigments: | C.I. Pigment Orange 69; C.I. Pigment Red 260; C.I. Pigment Yellow 139 and 185; |
| isoindolinone pigments: | C.I. Pigment Orange 61; C.I. Pigment Red 257 and 260; C.I. Pigment Yellow 109, 110, 173 and 185; |
| isoviolanthrone pigments: | C.I. Pigment Violet 31 (C.I. Vat Violet 1); |
| metal complex pigments: | C.I. Pigment Yellow 117, 150 and 153; C.I. Pigment Green 8; |
| perinone pigments: | C.I. Pigment Orange 43 (C.I. Vat Orange 7); C.I. Pigment Red 194 (C.I. Vat Red 15); |
| perylene pigments: | C.I. Pigment Black 31 and 32; C.I. Pigment Red 123, 149, 178, 179 (C.I. Vat Red 23), 190 (C.I. Vat Red 29) and 224; C.I. Pigment Violet 29; |
| phthalocyanine pigments: | C.I. Pigment Blue 15, 15:1, 15:2, 15:3, 15:4, 15:6 and 16; C.I. Pigment Green 7 and 36; |
| pyranthrone pigments: | C.I. Pigment Orange 51; C.I. Pigment Red 216 (C.I. Vat Orange 4); |
| thioindigo pigments: | C.I. Pigment Red 88 and 181 (C.I. Vat Red 1); C.I. Pigment Violet 38 (C.I. Vat Violet 3); |
| triarylcarbonium pigments: | C.I. Pigment Blue 1, 61 and 62; C.I. Pigment Green 1; C.I. Pigment Red 81, 81:1 and 169; C.I. Pigment Violet 1, 2, 3 and 27; |

C.I. Pigment Black 1 (aniline black);
C.I. Pigment Yellow 101 (aldazine yellow);
C.I. Pigment Brown 22;
vat dyes (in addition to those already mentioned above):
  C.I. Vat Yellow 2, 3, 4, 5, 9, 10, 12, 22, 26, 33, 37, 46, 35 48, 49 and 50;
  C.I. Vat Orange 1, 2, 5, 9, 11, 13, 15, 19, 26, 29, 30 and 31;
  C.I. Vat Red 2, 10, 12, 13, 14, 16, 19, 21, 31, 32, 37, 41, 51, 52 and 61;

C.I. Vat Violet 2, 9, 13, 14, 15, 17 and 21;

C.I. Vat Blue 1 (C.I. Pigment Blue 66), 3, 5, 10, 12, 13, 14, 16, 17, 18, 19, 20, 22, 25, 26, 29, 30, 31, 35, 41, 42, 43, 64, 65, 66, 72 and 74;

C.I. Vat Green 1, 2, 3, 5, 7, 8, 9, 13, 14, 17, 26, 29, 30, 31, 32, 33, 40, 42, 43, 44 and 49;

C.I. Vat Brown 1, 3, 4, 5, 6, 9, 11, 17, 25, 32, 33, 35, 38, 39, 41, 42, 44, 45, 49, 50, 55, 57, 68, 72, 73, 80, 81, 82, 83 and 84;

C.I. Vat Black 1, 2, 7, 8, 9, 13, 14, 16, 19, 20, 22, 25, 27, 28, 29, 30, 31, 32, 34, 36, 56, 57, 58, 63, 64 and 65;

inorganic pigments:

| | |
|---|---|
| white pigments: | titanium dioxide (C.I. Pigment White 6), zinc white, pigment grade zinc oxide; zinc sulfide, lithopone; lead white; |
| black pigments: | iron oxide black (C.I. Pigment Black 11), iron manganese black, spinell black (C.I. Pigment Black 27); carbon black (C.I. Pigment Black 7); |
| color pigments: | chromium oxide, chromium oxide hydrate green; chrome green (C.I. Pigment Green 48); cobalt green (C.I. Pigment Green 50); ultramarine green; cobalt blue (C.I. pigment Blue 28 and 36); ultramarine blue; iron blue (C.I. Pigment Blue 27); manganese blue; ultramarine violet; cobalt violet, manganese violet; iron oxide red (C.I. Pigment Red 101); cadmium sulfoselenide (C.I. Pigment Red 108); molybdate red (C.I. Pigment Red 104); ultramarine red; iron oxide brown, mixed brown, spinell and corundum phases (C.I. Pigment Brown 24, 29 and 31), chrome orange; iron oxide yellow (C.I. Pigment Yellow 42); nickel titanium yellow (C.I. Pigment Yellow 53; C.I. Pigment Yellow 157 and 164); chrome titanium yellow; cadmium sulfide and cadmium zinc sulfide (C.I. Pigment Yellow 37 and 35); chrome yellow (C.I. Pigment Yellow 34), zinc yellow, alkaline earth metal chromates; Naples yellow; bismuth vanadate (C.I. Pigment Yellow 184); |
| interference pigments: | metallic effect pigments based on coated metal platelets; pearl luster pigments based on mica platelets coated with metal oxide, liquid crystal pigments. |

Preferred pigments in this context are monoazo pigments (especially laked BONS pigments, naphthol AS pigments), disazo pigments (especially diaryl yellow pigments, bisacetoacetanilide pigments, disazopyrazolone pigments), quinophthalone pigments, phthalocyanine pigments, triarylcarbonium pigments (alkali blue pigments, dye salts with complex anions) and carbon black.

The pigment present in the pigment preparations of the invention should be very finely divided. It is preferred for 95%, preferably 99%, of the pigment particles to have a particle size $\leq 1$ μm.

The pigment particles can have different shapes and accordingly influence the flow behavior of the pigment preparations. Nonisometric pigment particles generally lead to higher flow viscosities and frequently to an absence of Newtonian flow characteristics, whereas isometric pigment particles generally produce less viscous preparations at the same pigment concentration and usually exhibit Newtonian flow characteristics.

The pigment preparations of the invention generally comprise from 0.1 to 20% by weight, preferably from 0.2 to 10% by weight, of pigment (A).

Component (B) of the pigment preparations of the invention is a water-soluble dispersant based on one or more arylsulfonic acid/formaldehyde condensation products (B1) or one or more water-soluble alkoxylated phenols (B2).

Preferred dispersants (B1) are condensation products having a sulfonic acid group content of not more than 40% by weight.

The condensation products (B1) are obtainable by sulfonation of aromatic compounds such as naphthalene itself or naphthalene-comprising mixtures and subsequent condensation of the resulting arylsulfonic acids with formaldehyde.

The preparation of the dispersant (B1) is preferably effected in the presence of aromatic or long-chain aliphatic carboxylic acids, their salts, their anhydrides or mixtures thereof.

A suitable starting material for preparing arylsulfonic acids is especially a mixture of aromatic compounds which are obtainable by thermal cracking of a naphthenic residue oil and fractionation of the cracking products. Naphthenic residue oils are obtained for example in the cracking of light gasoline and are also referred to as high boiling aromatic hydrocarbon oils. The naphthenic residue oil is preferably thermally cracked at 1400–1700° C. The cracking products are then subjected to a fractional distillation. The fraction which passes over at atmospheric pressure (1013 mbar) and 100–120° C. is collected and used as the aromatic compound in the sulfonation. Such a fraction is customarily obtained as a by-product in the known acetylene oil quench process (Ullmann's Encyclopedia of Industrial Chemistry, VCH Verlagsgesellschaft mbH, Weinheim, 1985, Volume A1, pages 107 to 112).

This aromatics fraction is a mixture of many aromatic substances whose structures and amounts can in practice not be determined in detail. The following aryl compounds are the main representatives in this aromatics fraction:

| | % by weight of aromatics fraction |
|---|---|
| Naphthalene | 30–55 |
| 2-Methylnaphthalene | 5–15 |
| 1-Methylnaphthalene | 4–10 |
| Indene | 3–10 |
| Biphenyl | 1–5 |
| Methylindene | 1–5 |
| Acenaphthene | 1–4 |

The aromatics fraction further comprises in terms of identified constituents amounts from 0.1 to about 2% by weight of the following aryl compounds: fluorine, indane, methylstyrene, phenanthrene, methylindane, dimethylnaphthalene, ethylnaphthalene, xylenes, tetralin, styrene, methylethylbenzene, anthracene, fluoranthrene, pyrene, acetnaphthylene and toluene.

Particularly suitable arylsulfonic acids generally comprise α- and β-naphthalenesulfonic acids, the ratio of the α- to the β-isomers being customarily within the range from 20:1 to 1:8, especially within the range from 10:1 to 1:5.

The carboxylic acid added is suitably an aromatic carboxylic acid or a derivative thereof, such as naphthalenecarboxylic acid, naphthalic acid, terephthalic acid, isophthalic acid, benzoic acid, trimellitic acid, phenylacetic acid, phenoxyacetic acid, salicylic acid, p-hydroxybenzoic acid, diphenylacetic acid, m-hydroxybenzoic acid, benzenetetracarboxylic acid or acid anhydrides such as phthalic anhydride, trimellitic anhydride, benzene-1,2,4,5-tetracarboxylic dianhydride or naphthalic anhydride.

Suitable long-chain aliphatic carboxylic acids include in particular saturated or olefinically unsaturated, linear or branched aliphatic monocarboxylic acids having from 8 to 22, preferably from 8 to 18, carbon atoms of a natural or synthetic origin, for example higher fatty acids such as caprylic acid, capric acid, lauric acid, myristic acid, palmitic acid, stearic acid, oleic acid, linoleic acid or linolenic acid or synthetically produced carboxylic acids such as 2-ethylhexanoic acid, isononanoic acid or isotridecanoic acid.

Also of interest are mixtures of anhydrides, mixtures of carboxylic acids, mixtures of salts of the contemplated carboxylic acids and also mixtures of carboxylic acids and anhydrides. As regards salts of the carboxylic acids mentioned, suitable salts are the alkali metal, ammonium or alkaline earth metal salts, said alkali metal, ammonium or alkaline earth metal salts being obtainable, for example, by neutralization of the corresponding carboxylic acids with sodium hydroxide, potassium hydroxide, lithium hydroxide, sodium carbonate, magnesium carbonate, calcium oxide, calcium hydroxide, ammonia or alkanolamines such as ethanolamine, diethanolamine or triethanolamine.

Particular preference is given to sodium benzoate, sodium phenylacetate, sodium salicylate, sodium 4-hydroxybenzoate, sodium terephthalate, sodium 2-hydroxy-3-naphthalenecarboxylate, naphthalene-1-carboxylic acid, phthalic anhydride or benzoic acid.

Dispersants (B1) which are particularly preferred for the pigment preparations of the invention comprise from 50 to 97% by weight, especially from 70 to 95% by weight, of arylsulfonic acid/formaldehyde condensation products and from 3 to 50% by weight, especially from 5 to 30% by weight, of aromatic or long-chain aliphatic carboxylic acids, their salts or their anhydrides or mixtures thereof.

The dispersants (B1) are known; cf. U.S. Pat. No. 5,186, 846, for example.

Preferred dispersants (B2) are alkoxylated phenols of the formula I or II

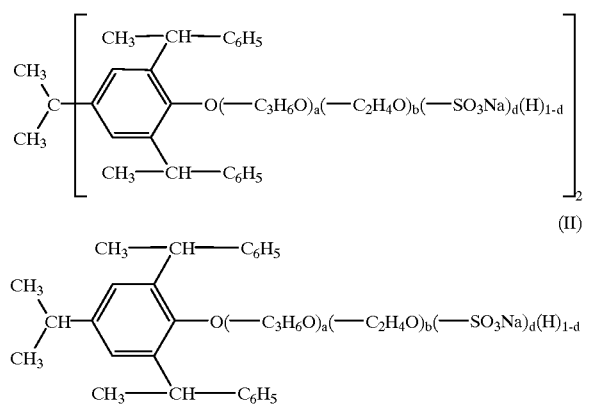

where
a is from 0 to on average 125,
b is on average from 37 to 250, the ratio b:a being at least 1:1 when b>37, and d is 0 or 1,
or mixtures thereof.

The products of the formulae I and II can be obtained by reacting the phenol derivatives of the formulae III or IV

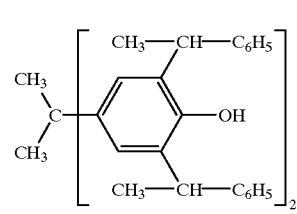

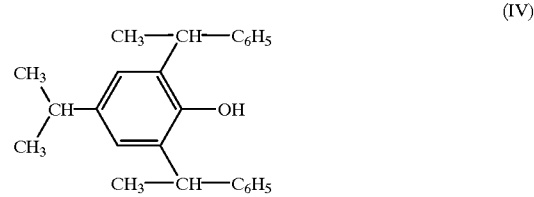

with propylene oxide and subsequent reaction of the adduct with ethylene oxide or by reacting III and/or IV with ethylene oxide. If desired, the adducts are reacted with chlorosulfonic acid or sulfur trioxide to convert them completely or partially into acid sulfuric esters and the resulting acid esters are neutralized with alkalis.

The phenols of the formulae III and IV can be obtained by reacting phenol or 2,2-(p,p'-bishydroxydiphenyl)propane with 3 or 30 4 mol of styrene in the presence of an acid as catalyst. The phenols III and IV are reacted according to known processes first with ethylene oxide or only with ethylene oxide in the presence of acidic or alkaline catalysts to form the corresponding alkoxylation products I and II where d=0. The alkoxylation can be carried out, for example, according to the processes described in U.S. Pat. No. 2,979,528. When b>37, it is mandatory that the ratio b/a >1.

The acid sulfuric esters are prepared by reaction of the alkoxylation products with chlorosulfonic acid or sulfur trioxide, the amount being selectable so that all the free hydroxyl groups are sulfated or only a portion thereof. The latter case produces mixtures of compounds of the formulae I and II which contain free and sulfated hydroxyl groups. For use as dispersant, the as-synthesized acid esters of sulfuric acid are converted into water-soluble salts. Advantageous water-soluble salts are the alkali metal salts, for example the sodium or potassium salts. For this two equivalents of the basic compounds are required in the case of chlorosulfonic acid, one equivalent in the case of sulfur trioxide. The basic compound used is advantageously an aqueous alkali metal hydroxide. The neutralization temperature should not exceed 70° C. The salts obtained can be used in the form of aqueous solutions or else isolated as such and used in solid form.

Preference is given to dispersants (B2) where a is from 0 to on average 2.5, b is on average from 37 to 250 and d is from 0 to on average 0.5. Particular preference is given to dispersants (B2) where a is 0 to on average 2.5, b is on average from 50 to 100 and d is on average 0.5.

The dispersants (B2) are known; cf. U.S. Pat. No. 4218 218, for example.

The pigment preparations of the invention generally comprise from 0.1 to 20% by weight, preferably from 0.5 to 10% by weight, of dispersant (B).

Water is the main constituent (C) of the pigment preparations of the invention. The water content is generally within the range from 35 to 90% by weight, preferably within the range from 45 to 80% by weight.

The pigment preparations of the invention preferably further comprise, as component (D), a water retention promoter to render them particular suitable for the ink-jet process.

Suitable for use as component (D) are polyhydric alcohols, preferably unbranched and branched $C_3$–$C_8$ alkanols such as glycerol, erythritol, pentaerythritol, pentitols such as arabitol, adonitol and xylitol, hexitols such as sorbitol, mannitol and dulcitol, particular preference being given to the $C_3$–$C_6$ alkanols, especially sorbitol.

Compounds suitable for use as component (D) further include polyalkylene glycols, which term also includes the lower (di-, tri- and tetra-)alkylene glycols. Preference is given to polyalkylene glycols having average molecular weights from 100 to 1500, and polyethylene glycols having an average molecular weight of $\leq 800$ are particularly preferred.

A particularly suitable component (D) of the pigment preparations of the invention is frequently a combination of polyhydric alcohol and polyalkylene glycol, said component (D) typically comprising from 0.1 to 35% by weight, especially from 5 to 25% by weight, of the weight of the preparation).

Suitable fluidity promoters for the pigment preparations of the invention further include water-soluble solvents which are slow to evaporate, such as N-methylpyrrolidone, 2-pyrrolidone and ethoxylation products of glycerol and pentaerythritol, which can be added in amounts from 0 to 15% by weight.

The pigment preparations of the invention may further comprise auxiliaries of the type which are customary especially for (aqueous) ink-jet inks and in the printing and coatings industry. Examples of such auxiliaries include preservatives (such as glutardialdehyde and/or tetramethylolacetyleneurea), antioxidants, degasers/defoamers, viscosity regulators, flow agents, wetters, antisettlers, luster improvers, lubricants, adhesion improvers, antiskinning agents, delusterants, emulsifiers, stabilizers, water repellents, light control additives, hand improvers and antistats. If such auxiliaries are part of the pigment preparations of the invention, the total amount is typically $\leq 1\%$ by weight, based on the weight of the preparation.

The pigment preparations of the invention have a viscosity which is typically within the range from 1 to 20 mm$^2$/sec, preferably within the range from 2 to 15 mm$^2$/sec.

The surface tension of the pigment preparations of the invention is generally within the range from 20 to 70 mN/m.

The pH of the pigment preparations of the invention is generally within the range from 5 to 11, preferably within the range from 6 to 10.

The pigment preparations of the invention are advantageously prepared as follows:

A press cake, for example, of the pigment is mixed together with the dispersant and optionally polyalkylene glycol in the presence of water, and the mixture is dispersed in a suitable apparatus. The resulting mixture is then ground in a mill to the desired pigmentary particle size. The millbase is finally end-adjusted by addition of appropriate amounts of water, optionally polyalkylene glycol and/or polyhydric alcohol and optionally further auxiliaries, mixing and filtration by means of a sieve, preferably having a pore size of 1 µm.

The novel pigment preparations are advantageously useful in the similarly novel process for printing sheetlike or three-dimensionally configured substrates by the ink-jet process, which comprises printing pigment preparations onto the substrate and, if desired, then fixing the print obtained.

In the ink-jet process, the typically aqueous inks are sprayed as small droplets directly onto the substrate. There is a continuous form of the process, in which the ink is pressed at a uniform rate through a nozzle and the jet is directed onto the substrate by an electric field depending on the pattern to be printed, and there is an interrupted or drop-on-demand process, in which the ink is expelled only where a colored dot is to appear, the latter form of the process employing either a piezoelectric crystal or a heated hollow needle (bubble or thermal jet process) to exert pressure on the ink system and so eject an ink droplet. These techniques are described in Text. Chem. Color 19 (1987), No. 8, 23–29, and 21 (1989), No. 6, 27–32.

The pigment preparations of the invention are particularly useful as inks f o r the bubble jet process or the process employing a piezoelectric crystal.

In the printing process of the invention, the print produced by application of the pigmentary ink can subsequently be fixed in various ways.

One way is the subsequent application of a binder, if desired in the form of a preferably aqueous dispersion or emulsion, and its curing (chemical crosslinking of the binder itself) or physical drying of the binder dispersion or emulsion, or to laminate a film (of polyethylene terephthalate, for example) onto the print to protect the print against water and light in particular.

The binder may in principle be applied using any process whereby a structured or unstructured coating can be produced. Examples of such processes include the techniques of screen printing, padding and spraying and other, uniform-coating techniques such as roller coating, offset printing, flexographic printing and casting, among which the techniques of spraying, printing and roller coating are particularly suitable.

The print may in principle be fixed using any kind of binder system, since the binder system does not have to be compatible with the aqueous pigment preparation of the invention owing to separate application.

It is possible to use radiation-curable, thermally curable or air-drying binders (ie. chemically crosslinking binders) or physically drying binder dispersions or emulsions where the liquid phase (water or organic solvent) evaporates, for example those based on nitrocellulose.

Radiation-curable binders for the purposes of the present invention are binders which are curable by radiation of high energy, ie. electromagnetic radiation especially from 220 to 450 nm (UV radiation), or electron beams. It is possible to use not only free-radically but also cationically polymerizable binder components and also mixtures thereof.

Such binder systems are common knowledge and described, for example, in Chemistry & Technology of UV & EB Formulation for Coatings, Inks & Paints, SITA Technology, London (1991), in The Printing Ink Manual, Fourth Edition, Van Nostrand Reinhold (International), London (1989), UV & EB Curing Formulation for Printing Inks and Paints, SITA Technology, London (1984) and in the BASF publication Vinyl Ethers, The Innovative Challenge (1997).

Examples of such radiation-curable binders include acrylate, vinyl and/or epoxy monomers, prepolymers and polymers and mixtures thereof.

Acrylate binders are especially prepolymers based on acrylate or methacrylate, acrylate compounds being particularly suitable.

Preferred (meth)acrylate compounds generally contain from 2 to 20, especially from 2 to 10, in particular from 2 to 6, copolymerizable, ethylenically unsaturated double bonds.

The number average molecular weight of the (meth) acrylate compounds is preferably ≦15,000, particularly preferably ≦5000, very particularly preferably within the range from 180 to 3000 g/mol (determined by gel permeation chromatography using polystyrene as standard and tetrahydrofuran as mobile phase).

Examples of suitable (meth)acrylate compounds include (meth)acrylic esters and especially acrylic esters of polyhydric alcohols, especially polyhydric alcohols which, beside the hydroxyl groups, contain no further functional groups or at most ether groups. Examples of such alcohols include dihydric alcohols, such as ethylene glycol, propylene glycol and their higher condensed representatives, eg. diethylene glycol, triethylene glycol, dipropylene glycol and tripropylene glycol, butanediol, pentanediol, hexanediol, neopentylglycol, alkoxylated phenolic compounds, such as ethoxylated and propoxylated bisphenols, cyclohexanedimethanol, trihydric and higher alcohols, such as glycerol, trimethylolpropane, butanetriol, trimethylolethane, pentaerythritol, ditrimethylolpropane, dipentaerythritol, sorbitol, mannitol and the corresponding alkoxylated, especially ethoxylated and propoxylated, alcohols.

Alkoxylation products are obtainable in a conventional manner by reacting the aforementioned alcohols with alkylene oxides, especially ethylene oxide or propylene oxide. The degree of alkoxylation can be up to 10 per hydroxyl group—that is, 1 mol of hydroxyl group can be alkoxylated with up to 10 mol of alkylene oxide.

Suitable (meth)acrylate compounds further include polyester (meth)acrylates, polyester (meth)acrylates being the (meth)acrylic esters of polyesterols, which can be saturated or unsaturated.

Suitable polyesterols include for example polyesterols as are preparable by esterification of polycarboxylic acids, preferably dicarboxylic acids, with polyols, preferably diols. The starting materials for such hydroxyl-containing polyesters are known to one skilled in the art. Preferred dicarboxylic acids include succinic acid, glutaric acid, adipic acid, sebacic acid, maleic acid, fumaric acid, o-phthalic acid, their isomers and hydrogenation products and also esterifiable derivatives, such as anhydrides or dialkyl esters of the acids mentioned. Suitable polyols include the abovementioned alcohols, preferably ethylene glycol, 1,2-propylene glycol, 1,3-propylene glycol, 1,4-butanediol, 1,6-hexanediol, neopentylglycol, cyclohexanedimethanol and also polyalkylene glycols based on ethylene glycol and propylene glycol.

Polyester (meth)acrylates may be prepared in multiple steps or else in a single step, as described in EP-A-279 303, from (meth)acrylic acid, polycarboxylic acid and polyol.

Epoxy (meth)acrylates and urethane (meth)acrylates are further useful acrylate compounds.

Epoxy (meth)acrylates are obtainable for example in a conventional manner by reaction of epoxidized olefins or mono-, di- or polyglycidyl ethers, such as bisphenol A diglycidyl ether, with (meth)acrylic acid.

Urethane (meth)acrylates are especially reaction products of hydroxyalkyl (meth)acrylates with poly- or diisocyanates.

Melamine acrylates and silicone acrylates may also be mentioned.

Acrylate compounds may be modified to be nonionic—by attachment of amino groups, for example—or ionic—by attachment of acid groups or ammonium groups, for example—and be used in the form of preferably aqueous dispersions or emulsions (eg. EP-A-704 469, EP-A-12 339).

Furthermore, the undiluted acrylate polymers may be adjusted to the desired viscosity by means of reactive diluents.

Examples of suitable reactive diluents include vinylmonomers, especially N-vinyl compounds such as N-vinylpyrrolidone, N-vinylcaprolactam and N-vinylformamide, and vinyl ethers such as ethyl vinyl ether, propyl vinyl ether, isopropyl vinyl ether, butyl vinyl ether, isobutyl vinyl ether, tert-butyl vinyl ether, amyl vinyl ether, 2-ethylhexyl vinyl ether, dodecyl vinyl ether, octadecyl vinyl ether and cyclohexyl vinyl ether, ethylene glycol monovinyl ether, ethylene glycol divinyl ether, diethylene glycol monovinyl ether, diethylene glycol divinyl ether, triethylene glycol monovinyl ether, triethylene glycol divinyl ether, tetraethylene glycol monovinyl ether, tetraethylene glycol divinyl ether, polyethylene glycol divinyl ether, ethylene glycol butyl vinyl ether, triethylene glycol methyl vinyl ether, polyethylene glycol methyl vinyl ether, butanediol monovinyl ether, butanediol divinyl ether, hexanediol monovinyl ether, hexanediol divinyl ether, cyclohexanedimethanol monovinyl ether, cyclohexanedimethanol divinyl ether, trimethylolpropane trivinyl ether, aminopropyl vinyl ether, diethylaminoethyl vinyl ether, and polytetrahydrofuran divinyl ether, vinyl esters, such as vinyl acetate, vinyl propionate, vinyl stearate and vinyl laurate, and aromatic vinyl compounds, such as vinyltoluene, styrene, 2-butylstyrene, 4-butylstyrene and 4-decylstyrene, and also acrylate monomers, such as phenoxyethyl acrylate, tert-butylcyclohexyl acrylate, hexanediol diacrylate, tripropylene glycol diacrylate and trimethylolpropane triacrylate.

Vinyl compounds may also be used directly as cationically polymerizable binders.

As radiation-curable binders there may further be used epoxy compounds, such as cyclopentene oxide, cyclohexene oxide, epoxidized polybutadiene, epoxidized soybean oil, 3',4'-epoxycyclohexylmethyl 3,4-epoxycyclohexanecarboxylate and glycidyl ethers, eg. butanediol diglycidyl ether, hexanediol diglycidyl ether, bisphenol A diglycidyl ether and pentaerythritol biglycidyl ether, in which case cationically polymerizable monomers, for example unsaturated aldehydes and ketones, dienes such as butadiene, aromatic vinyl compounds such as styrene, N-substituted vinylamines such as vinylcarbazole and cyclic ethers such as tetrahydrofuran, may likewise be used as well.

In the particular case where the binder is to be cured by means of UV radiation, it is advisable to apply the binder to the print together with a photoinitiator to initiate the polymerization.

Examples of photoinitiators which are suitable for free-radical photopolymerizations, ie. the polymerization of acrylates and, if desired, vinyl compounds, include benzophenone and benzophenone derivatives such as 4-phenylbenzophenone and 4-chlorobenzophenone, acetophenone derivatives such as 1-benzoylcyclohexan-1-ol, 2-hydroxy-2,2-dimethylacetophenone and 2,2-dimethoxy-2-phenylacetophenone, benzoin and benzoin ethers such as methyl benzoin ether, ethyl benzoin ether and butyl benzoin ether, benzil ketals such as benzil dimethyl ketal, 2-methyl-1-[4-(methylthio)phenyl]-2-morpholinopropan-1-one, acylphosphine oxides such as 2,4,6-trimethylbenzoyldiphenyl-phosphine oxide and bisacylphosphine oxides.

Examples of photoinitiators which are suitable for cationic photopolymerizations, ie. the polymerization of vinyl compounds or epoxy compounds, include aryldiazonium salts such as 4-methoxybenzenediazonium hexafluorophosphate, benzenediazonium tetrafluoroborate and toluenediazoniumtetrafluoroarsenate, aryl iodonium salts such as diphenyliodonium hexafluoroarsenate, arylsulfonium salts such as triphenylsulfonium hexafluorophosphate, benzenesulfonium hexafluorophosphate, toluenesulfonium hexafluorophosphate and bis[4-diphenylsulfoniophenyl] sulfide bishexafluorophosphate, disulfones such as diphenyl disulfone and phenyl 4-tolyl disulfone, diazodisulfones, imidotriflates, benzoin tosylates, isoquinolinium salts such as N-ethoxyisoquinolinium hexafluorophosphate, phenylpyridinium salts such as N-ethoxy-4-phenylpyridinium hexafluorophosphate, picolinium salts such as N-ethoxy-2-picolinium hexafluorophosphate, ferrocenium salts and titanocenes.

Where the presence of a photoinitiator is required, it is generally used in amounts from 0.1 to 10% by weight, preferably from 0.1 to 8% by weight, based on the weight of the binder.

Thermally curable binders are typically crosslinked by polycondensation or polyaddition reactions.

These binder systems are likewise common knowledge and described for example in Glasurit-Handbuch Lacke und Farben der BASF Farben +Fasern AG, Vincentz Verlag, Hannover (1984) and in Lackharze Chemie, Eigenschaften, Anwendungen, Karl Hauser Verlag, Munich/Vienna (1996).

It is particularly useful to use, for example, polycondensation-crosslinkable binders based on acrylates which contain methylol groups.

Examples of preferred systems include mixtures of from 1 to 10% by weight of N-methylol (meth)acrylamide or its $C_1$-$C_4$-alkyl ethers and, if desired, monomers which contain halohydrin groups such as 2-hydroxy-3-chloropropylene acrylate and from 90 to 99% by weight of comonomers selected, for example, from the group consisting of butadiene, styrene, (meth)acrylic acid, (meth)acrylamide, (meth) acrylonitrile, (meth)acrylic and vinyl esters having up to 12 carbon atoms, vinyl chloride and N-vinylpyrrolidone, as described for example in DE-A-16 19 656.

Acrylic acid derivatives which contain methylol groups bring about additional crosslinking in the presence of acids or of compounds which detach protons when heated, such as ammonium phosphates.

Examples of air-drying binders where aliphatic double bonds are oxidatively crosslinked by the action of atmospheric oxygen are drying oils such as linseed oil, wood oil and safflower oil.

If the binder, as is preferred in the printing process of the invention, is applied in the form of a dispersion or emulsion to the print produced using the pigment preparations of the invention, the binder content of these dispersions or emulsions is generally within the range from 10 to 60% by weight, preferably within the range from 30 to 50% by weight.

It is customary to use sufficient binder to form a protective film on the print which is from about 1 to 30 $\mu$m in thickness when dry.

The subsequent curing of the binder, ie. the fixing of the print, can be effected in a conventional manner using high energy radiation when radiation-curable binders are used. To this end, the print is irradiated either with electrons (electron beam curing) under an inert gas (nitrogen, for example) or with high energy electromagnetic radiation, preferably in the wavelength range from 220 to 450 nm. The light intensities which are selected have to be adapted to the rate of curing to avoid any degradation of the colorant. In the case of a lamp power output of from 120 to 240 W/cm, the rate of curing can be up to 100 m/min, for example, depending on the concentration and type of photoinitiator.

When thermally curable binders are used, the curing can likewise be effected in a conventional manner with the aid of hot air, superheated steam, IR radiation or microwave radiation.

The pigment preparations of the invention may be printed on all types of substrate materials. Examples of substrate materials include coated or uncoated cellulosics such as paper, paperboard, cardboard, wood and woodbase, coated or uncoated metallic materials such as foils, sheets or workpieces composed of aluminum, iron, copper, silver, gold, zinc or alloys thereof, coated or uncoated silicatic materials such as glass, bporcelain and ceramics, polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinyl pyrrolidones and corresponding block and nonblock copolymers, biodegradable polymers and natural polymers such as gelatin, textile materials such as fibers, yarns, threads, knits, wovens, nonwovens and garments composed of polyester, modified polyester, polyester blend fabrics, cellulosics such as cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric, leather—both natural and artificial—in the form of smooth leather, nappa leather or suede leather, comestibles and cosmetics.

The substrate material may be sheetlike or three-dimensional in configuration and may be printed with the pigment preparations of the invention both uniformly and imagewise.

The pigment preparations of the invention are useful ink-jet inks having altogether advantageous application properties, especially good flow characteristics, producing prints of high lightfastness and waterfastness.

EXAMPLES

I) Making of pigment preparations according to the invention 15 g of pigment, 15 g of polyethylene glycol (average molecular weight: 400), 7.5 g of a dispersant (B1') based on an arylsulfonic acid/formaldehyde condensation product and further comprising benzoic acid, the dispersant used being dispersant 3 of U.S. Pat. No. 5,186,846, or 7.5 g of a dispersant (B2') based on an alkoxylated phenol, the dispersant used being dispersant 13 of U.S. Pat. No. 4,218,218, 0.37 g of a 50% strength by weight aqueous solution of glutardialdehyde and 0.75 g of a 47% strength by weight aqueous solution of tetramethylolacetyleneurea were made up with water to a total weight of 100 g and pasted up in a mill. The pH was then adjusted to 8.5 with 10% strength by weight aqueous sodium hydroxide solution.

The mixture was then ground in a stirred ball mill until 99% of the pigment particles were less than 1 $\mu$m in size.

For final adjustment, 26.7 g (4% strength by weight preparations) or 33.3 g (5% strength by weight preparations) of millbase were admixed with a further 4 g of the polyethylene glycol, 0.1 g of a 50% strength by weight aqueous solution of glutardialdehyde, 0.3 g of a 47% strength by weight aqueous solution of tetramethylolacetylenediurea and 20 g of a 70% strength by weight aqueous sorbitol solution (instead of the sorbitol solution, 23 g of ethylene glycol or 12.5 g of glycerol or 20 g of diethylene glycol or 20 g of 1,2-propylene glycol), made up with water to a total weight of 100 g, mixed and filtered through a sieve having a pore size of 1 μm.

Further particulars of the pigment preparations obtained in this way are summarized in Table 1. The percentages are each by weight.

|  | Preparation no. | | | | | | | | | | |
|---|---|---|---|---|---|---|---|---|---|---|---|
|  | 1 | 2 | 3 | 4 | 5 | 6 | 7 | 8 | 9 | 10 | 11 |
| C.I. Pigment Yellow 138 | 4% | | | | | | | | | | |
| C.I. Pigment Red 146 | | 4% | | | | | | | | | |
| C.I. Pigment Blue 15:3 | | | 4% | | | 3% | 2% | | 4% | 4% | |
| C.I. Pigment Black 7 | | | | 4% | | | | | | | |
| C.I. Pigment Green 7 | | | | | | | | 4% | | | |
| C.I. Pigment Violet 19 | | | | | 4% | | | | | | |
| C.I. Vat Yellow 46 | | | | | | | | | | | 4% |
| C.I. Vat Red 1 | | | | | | | | | | | |
| C.I. Vat Blue 5 | | | | | | | | | | | |
| Dispersant | 2% B1' | 2% B1' | 2% B1' | 2% B1' | 2% B1' | 2% B1' | 2% B1' | 2% B1' | 2% B1' | 2% B1' | 2% B1' |
| Polyethylene glycol | 8% | 8% | 8% | 8% | 8% | 8% | 8% | 8% | 8% | 8% | 8% |
| 70% strength aqueous solution of sorbitol | 20% | 20% | 20% | 20% | 20% | 20% | 20% | 20% | | | 20% |
| Ethylene glycol | | | | | | | | | | | |
| Glycerol | | | | | | | | | 20% | | |
| Diethylene glycol | | | | | | | | | | 20% | |
| 1,2-Propylene glycol | | | | | | | | | | | |
| 50% strength aqueous solution of glutardialdehyde | 0.5% | 0.5% | 0.5% | 0.5% | 0.5% | 0.5% | 0.5% | 0.5% | 0.5% | 0.5% | 0.5% |
| 4% strength aqueous solution of tetramethylolacetyleneurea | 1.0% | 1.0% | 1.0% | 1.0% | 1.0% | 1.0% | 1.0% | 1.0% | 1.0% | 1.0% | 1.0% |
| Demineralized water | 64.5% | 64.5% | 64.5% | 64.5% | 64.5% | 65.5% | 66.5% | 64.5% | 64.5% | 64.5% | 64.5% |
| Total | 100% | 100% | 100% | 100% | 100% | 100% | 100% | 100% | 100% | 100% | 100% |

|  | Preparation no. | | | | | | | | | |
|---|---|---|---|---|---|---|---|---|---|---|
|  | 12 | 13 | 14 | 15 | 16 | 17 | 18 | 19 | 20 | 21 |
| C.I. Pigment Yellow 138 | | | 4% | | | 4% | | 4% | 5% | |
| C.I. Pigment Red 146 | | | | | | 4% | | | | |
| C.I. Pigment Blue 15:3 | | | | 4% | | | | | | 5% |
| C.I. Pigment Black 7 | | | | | 4% | | | | | |
| C.I. Pigment Green 7 | | | | | | | | | | |
| C.I. Pigment Violet 19 | | | | | | | 4% | | | |
| C.I. Vat Yellow 46 | | | | | | | | | | |
| C.I. Vat Red 1 | 4% | | | | | | | | | |
| C.I. Vat Blue 5 | | 4% | | | | | | | | |
| Dispersant | 2% B1' | 2% B1' | 2% B1' | 2% B1' | 2% B1' | 2% B1' | 2% B1' | 2% B1' | 2.4% B2' | 2.4% B2' |
| Polyethylene glycol | 8% | 8% | 4% | 4% | 4% | 4% | 4% | 4% | 5% | 5% |
| 70% strength aqueous solution of sorbitol | 20% | 20% | 12.5% | 12.5% | 12.5% | 12.5% | 12.5% | 12.5% | 12.5% | 12.5% |
| Ethylene glycol | | | | | | | | | | |
| Glycerol | | | | | | | | | | |
| Diethylene glycol | | | | | | | | | | |
| 1,2-Propylene glycol | | | | | | | | | | |
| 50% strength aqueous solution of glutardialdehyde | 0.5% | 0.5% | 0.15% | 0.15% | 0.15% | 0.15% | 0.15% | 0.15% | 0.15% | 0.15% |
| 4% strength aqueous solution of tetramethylolacetyleneurea | 1.0% | 1.0% | 0.55% | 0.55% | 0.55% | 0.55% | 0.55% | 0.55% | 0.55% | 0.55% |
| Demineralized water | 64.5% | 64.5% | 76.8% | 76.8% | 76.8% | 76.8% | 76.8% | 76.8% | 74.4% | 74.4% |
| Total | 100% | 100% | 100% | 100% | 100% | 100% | 100% | 100% | 100% | 100% |

|  | Preparation no. | | | | | | | | | |
|---|---|---|---|---|---|---|---|---|---|---|
|  | 22 | 23 | 24 | 25 | 26 | 27 | 28 | 29 | 30 | 31 |
| C.I. Pigment Yellow 138 | | 5% | | | | | 5% | | | |
| C.I. Pigment Red 146 | | | | | | | | | | |
| C.I. Pigment Blue 15:3 | | | | 5% | | | | 5% | | |
| C.I. Pigment Black 7 | 5% | | | | 5% | | | | 5% | |
| C.I. Pigment Green 7 | | | 5% | | | | | | | |
| C.I. Pigment Violet 19 | | | | | | 5% | | | | 5% |

-continued

| | | | | | | | | | | |
|---|---|---|---|---|---|---|---|---|---|---|
| C.I. Vat Yellow 46 | | | | | | | | | | |
| C.I. Vat Red 1 | | | | | | | | | | |
| C.I. Vat Blue 5 | | | | | | | | | | |
| Dispersant | 2.4% B2' | 2.4% B2' | 2.4% B2' | 2.4% B2' | 2.4% B2' | 2.4% B2' | 2.4% B2' | 2.4% B2' | 2.4% B2' | 2.4% B2' |
| Polyethylene glycol | 5% | 5% | 5% | 5% | 5% | 5% | 5% | 5% | 5% | 5% |
| 70% strength aqueous solution of sorbitol | | | | | | | | | | |
| Ethylene glycol | | | 33% | 33% | 33% | 33% | | | | |
| Glycerol | 12.5% | 12.5% | | | | | | | | |
| Diethylene glycol | | | | | | | | | | |
| 1,2-Propylene glycol | | | | | | | 20% | 20% | 20% | 20% |
| 50% strength aqueous solution of glutardialdehyde | 0.15% | 0.15% | 0.15% | 0.15% | 0.15% | 0.15% | 0.15% | 0.15% | 0.15% | 0.15% |
| 4% strength aqueous solution of tetramethylolacetyleneurea | 0.55% | 0.55% | 0.55% | 0.55% | 0.55% | 0.55% | 0.55% | 0.55% | 0.55% | 0.55% |
| Demineralized water | 74.4% | 74.4% | 53.9% | 53.9% | 53.9% | 53.9% | 66.9% | 66.9% | 66.9% | 66.9% |
| Total | 100% | 100% | 100% | 100% | 100% | 100% | 100% | 100% | 100% | 100% |

II) Testing of physical and printing properties of pigment preparations

The pigment preparations 1 to 31 had an unlimited storage life and did not coagulate.

Their physical and printing properties are summarized in Table 2 and were tested as follows:

1) Surface tension

Surface tension measured with a Krüss K 10 digital tensiometer. The values reported in Table 2 are the averages of 3 measurements.

2) Viscosity

Kinetic viscosity was determined by the Ubbelohde method (DIN 51662).

3) pH pH was determined with a Knick 763 pH meter.

4) Cogation test

Ink behavior in the nozzles during printing is of particular importance. The following test examines the tendency of an ink to form deposits and blockages in the nozzles:

A modified Stylus Color 500 bubble jet printer from Epson was used as test equipment.

First, the average drop weight was determined as a function of the voltage applied to the nozzles. Then 1 million pulses were sent to each nozzle at constant voltage and thereafter the average drop weight of a defined number of drops was redetermined. This operation was repeated 10 times in total.

With an ideal ink, the average drop weight should remain constant over the test period.

The change in the drop weight of the individual inks is shown in Table 2.

TABLE 2

| | Preparation no. | | | | | | | | | | |
|---|---|---|---|---|---|---|---|---|---|---|---|
| | 1 | 2 | 3 | 4 | 5 | 6 | 7 | 8 | 9 | 10 | 11 |
| Surface tension [mM/m] | 57.8 | 52.3 | 57.4 | 61.4 | 56.3 | 62.4 | 62.3 | 62.1 | 59.4 | 49.4 | 56.6 |
| Kinetic viscosity [mm$^2$/s] | 3.3 | 3.3 | 4.7 | 6.2 | 3.5 | 4.4 | 2.8 | 7.3 | 9.6 | 13.3 | 11.1 |
| pH | 7.0 | 7.0 | 7.0 | 7.0 | 7.0 | 7.0 | 7.0 | 7.0 | 7.0 | 7.0 | 6.9 |
| Drop weight [ng] | 154 | 121 | 92 | 107 | 122 | 115 | 153 | 108 | 124 | 115 | 80 |
| Cogation test (p: passed) | p | p | p | p | p | p | p | p | p | p | p |

| | Preparation no. | | | | | | | | | |
|---|---|---|---|---|---|---|---|---|---|---|
| | 12 | 13 | 14 | 15 | 16 | 17 | 18 | 19 | 20 | 21 |
| Surface tension [mM/m] | 45.8 | 46.4 | 50.3 | 50.5 | 51.2 | 49.9 | 53.1 | 48.2 | 50.2 | 50.5 |
| Kinetic viscosity [mm$^2$/s] | 4.6 | 2.7 | 3.6 | 4.1 | 3.8 | 3.5 | 3.5 | 3.7 | 3.8 | 4.9 |
| pH | 6.9 | 7.0 | 7.9 | 7.9 | 7.9 | 7.8 | 8.0 | 8.0 | 7.8 | 7.9 |
| Drop weight [ng] | 120 | 140 | 129 | 115 | 132 | 130 | 125 | 131 | 128 | 114 |
| Cogation test (p: passed) | p | p | p | p | p | p | p | p | p | p |

| | Preparation no. | | | | | | | | | |
|---|---|---|---|---|---|---|---|---|---|---|
| | 22 | 23 | 24 | 25 | 26 | 27 | 28 | 29 | 30 | 31 |
| Surface tension [mM/m] | 50.4 | 50.2 | 49.4 | 49.8 | 49.0 | 48.2 | 46.2 | 47.5 | 45.7 | 47.2 |
| Kinetic viscosity [mm$^2$/s] | 4.0 | 3.7 | 4.9 | 5.7 | 5.1 | 5.0 | 5.1 | 5.9 | 5.4 | 5.1 |
| pH | 8.0 | 7.9 | 7.8 | 7.9 | 8.0 | 7.8 | 8.0 | 8.1 | 7.9 | 7.8 |
| Drop weight [ng] | 134 | 130 | 125 | 117 | 138 | 131 | 123 | 113 | 128 | 125 |
| Cogation test (p: passed) | p | p | p | p | p | p | p | p | p | p |

III) Use of the pigment preparations as ink in the ink-jet process a) Pigment preparations 1 to 10 were each applied with a commercially available ink-jet printer from Hewlett-Packard (HP 500) or with a commercially available ink-jet printer from Epson (Stylus Color 500) to produce a test image (in each case a strip 3 cm in width and 20 cm in length) with a resolution of 300 dpi or 720 dpi on the following substrates:

commercially available papers suitable for the resolution mentioned (Intercopy, Premium Glossy from Hewlett-Packard; Special Coated Paper for 720 dpi Printing from Epson):

paper-clad cotton;

paper-clad aluminum foil.

Pigment preparations 1 to 10 produced brilliant prints on all substrates with both printers. The colored prints had lightfastnesses >6 on the wool scale. Compared with dye-based inks, distinctly better waterfastness properties were observed.

b) Pigment preparation 3 was printed uniformly onto woven cotton (23 threads/cm).

To increase the rubfastness, waterfastness and washfastness of the print, the print was subsequently coated with A) a 40% strength aqueous dispersion of a commercially available thermally curable textile binder based on an acrylate/styrene copolymer and comprising 2% by weight of diammonium hydrogenphosphate as acid donor, or B) a 40% strength by weight aqueous dispersion of a UV-curable polyurethane obtained similarly to Example 1 of EP-A-704 463 using a polyester having a number average molecular weight of about 1000, comprising 3% by weight of 2-hydroxy-2,2-dimethylacetophenone as photoinitiator.

Binder A) was cured by heating to 150° C. in a drying cabinet for 5 minutes, and binder B) was cured by irradiation on a UV belt coater from Fusion (D-radiator, 120 W/cm, curing speed 10 m/min).

Further details of these experiments and the results obtained on testing the washfastness (DIN 54011=ISO 105C04) and the rubfastness (DIN 54021=ISO 105X12) are summarized in Table 3.

TABLE 3

| Pigment preparation no. | 3 | 3 | 3 | 3 |
|---|---|---|---|---|
| Binder | A | A | A | B |
| Method of application | Screen printing | Padding | Spraying | Spraying |
| Washfastness | 4–5 | 4 | 4–5 | 3–4 |
| Rubfastness | 4 | 4 | 4 | 3–4 |
| Hand | medium harsh | medium harsh | soft | soft to medium harsh | c) Pigment preparations 11 to 13 and a black preparation (no. 14) obtained by mixing 17 g of preparation 11, 17 g of preparation 12 and 64 g of preparation 13, were applied to an untreated woven cotton fabric (23 threads/cm) as a test image (in each case a strip 4 cm in width and 20 cm in length) using a Desk Jet 500 printer from Hewlett-Packard.

Each print was the n fixed by the 2 pH method which is described, for example, in the 1993 BASF Aktiengesellschaft technical bulletin "Printing with vat dyes on cellulose fibers".

In all cases, prints of high lightfastness, washfastness and rubfastness were obtained.

We claim:

1. A process for printing sheet or three-dimensionally configured substrates by the ink-jet process, which comprises ink-jet printing a pigment preparation onto a substrate to produce a print, the pigment preparation comprising:

(A) at least one finely divided, organic or inorganic pigment, (B) a dispersant of the formula I or II:

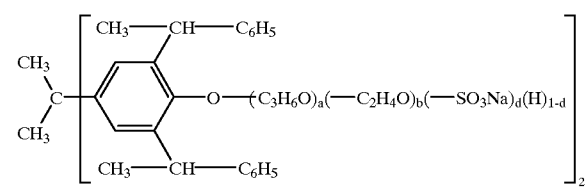

(I)

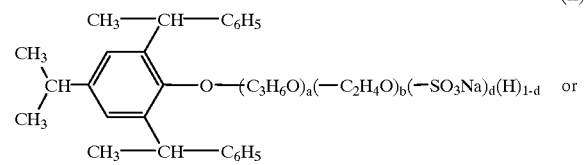

(II)

where a is from 0 to an average 125, b is on average from 37 to 250, the ratio b:a being at least 1:1 when b>37, and d is 0 or 1, or mixtures thereof, and (C) water.

2. The process of claim 1, wherein the print obtained is fixed after the step of ink-jet printing.

3. The process of claim 2, wherein the print is fixed by applying a binder in the form of a dispersion or emulsion, and curing it or by laminating a film onto the print.

4. The process of claim 2, wherein the print is affixed by applying a dispersion or emulsion of a thermally curable binder, of an air-drying binder or of a radiation-curable binder having a photoinitiator, or of physically drying binder.

5. The process of claim 3, wherein the binder is cured by the action of IR or microwave radiation, by electron beam curing or by high energy electromagnetic radiation.

* * * * *

UNITED STATES PATENT AND TRADEMARK OFFICE
CERTIFICATE OF CORRECTION

PATENT NO. : 6,332,943 B1
DATED : December 25, 2001
INVENTOR(S) : Herrmann et al.

It is certified that error appears in the above-identified patent and that said Letters Patent is hereby corrected as shown below:

<u>Title page,</u>
Item [86], the PCT information should read:
-- [86]  PCT No.:       PCT/EP98/03708
         § 371 Date:    Feb. 14, 2000
         § 102(e) Date: Feb. 14, 2000 --

Signed and Sealed this

Fifth Day of November, 2002

*Attest:*

*Attesting Officer*

JAMES E. ROGAN
*Director of the United States Patent and Trademark Office*